P. B. CUNNINGHAM.
MILITARY RIFLE.
APPLICATION FILED JAN. 16, 1920.

1,344,991.

Patented June 29, 1920.
5 SHEETS—SHEET 4.

Inventor
Paul B. Cunningham,
by
T. A. Witherspoon
Attorney

UNITED STATES PATENT OFFICE.

PAUL B. CUNNINGHAM, OF THE UNITED STATES ARMY.

MILITARY RIFLE.

1,344,991.   Specification of Letters Patent.   Patented June 29, 1920.

Application filed January 16, 1920. Serial No. 351,808.

*To all whom it may concern:*

Be it known that I, PAUL B. CUNNINGHAM, a sergeant in the United States Army, and a citizen of the United States, at present residing at Wheeling, in the county of Ohio and State of West Virginia, have invented certain new and useful Improvements in Military Rifles, and I do hereby declare the following to be a full, clear, and exact description of the invention, such as will enable others skilled in the art to which it appertains to make and use the same.

This invention relates to military rifles, and has for its object to provide a fire arm of this character which will be comparatively inexpensive to manufacture and more certain and efficient in action than those heretofore proposed.

With this and other objects in view the invention consists in the novel parts and combinations of parts more fully hereinafter disclosed and particularly pointed out in the claims.

Referring to the accompanying drawings forming a part of this specification, in which like numerals designate like parts in all the views:—

1 indicates any suitable barrel having a muzzle 2, to which is screw threaded as at 3, the member 4, having the opening 5 for the escape of the bullet, and the chamber 6 for the expansion of a portion of the gases. Said member 4 also carries the screw plug 7 adapted to control the entrance of the gases from chamber 6 through the port 8 of the tube 9, one end of which screws into said member 4 as at 10. In said tube 9 is located the piston 11, carrying the projection 12, and controlled by the spring 13. Secured to the tube 9 is the operating tube 14 in which is located the piston 15, and spring 16. Said piston 15 is provided with the rod 17 passing through the cap 18, and secured as at 19 to the semi-cylindrical action slide 20. Said slide is provided with the curved bolt operating slot 21 and with the cocking tang 22, as will be clear from Figs. 11, 12, 15 and 16. The bolt sleeve 25 is provided with the usual guide or recoil lug 27, having a forward extension 26 carrying at its forward end the operating lug 28, moving in the slot 21 and having secured thereto the button or cap 29 to hold the parts in position. The bolt is further provided with a cocking head 30, and rigid with said cocking head is the firing rod 31 surrounded by the firing, or main spring 32, abutting at one end against the sleeve, or member 33, surrounding the joint 34 between said rod 31 and the firing pin 35. The other end of the spring 32 abuts against the screw plug member 36, see Fig. 15, provided with the screw threads 37 and flange-like member 38 in which is pivoted the locking lever 39, the free end of which enters the cutaway space 40 with which the rear end of the bolt sleeve 25 is provided.

Figure 15:
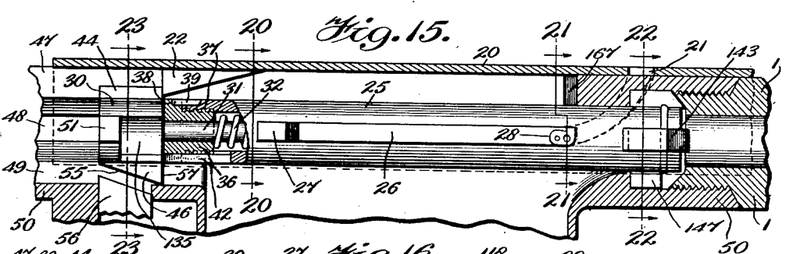
Fig. 15 is a longitudinal sectional view of the forward portion of the receiver showing the bolt in its firing position.
Figure 16:
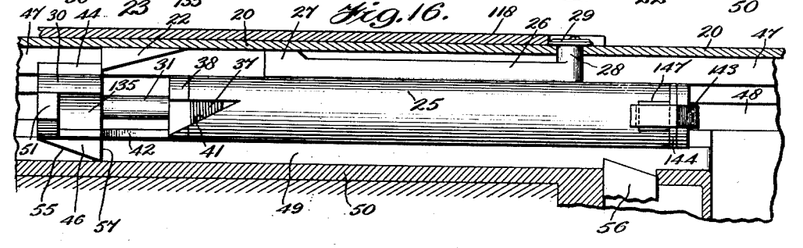
Fig. 16 is a sectional view of the rear portion of the receiver showing bolt retracted.
Figure 17:
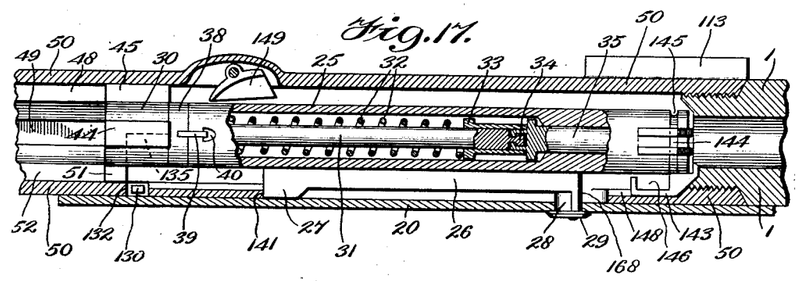
Fig. 17 is a sectional plan view on a plane at right angles to the plane of, and showing the same parts as Fig. 15.
Figures 18, 19:
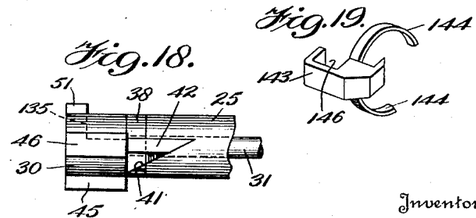
Fig. 18 is a detached view of the rear end of the bolt.
Fig. 19 is a perspective view of the extractor.

The said member 38, as well as the rear end of the bolt sleeve 25 is cutaway as best shown in Figs. 15, 16 and 18 to form the V-shaped slot 41 to accommodate during the firing operation, the projection 42 carried by the cocking head 30 all as will be clear from Fig. 18. Said cocking head 30 is further provided with the guide lugs 44, 45, 46, see Fig. 23, moving respectively in the slots or ways 47, 48 and 49, with which the receiver 50 is provided, and also with lug 51 moving in the way 52 of the receiver, all as will be clear from Figs. 2, 15, 16, 17 and 23. The lug 46 as best shown in Figs. 15 and 16 is provided with an inclined face 55 to slide over the sear 56 and with an abrupt shoulder 57 to catch against said sear, all as will be more fully explained below.

Figures 1, 2, 3, 4, 5:
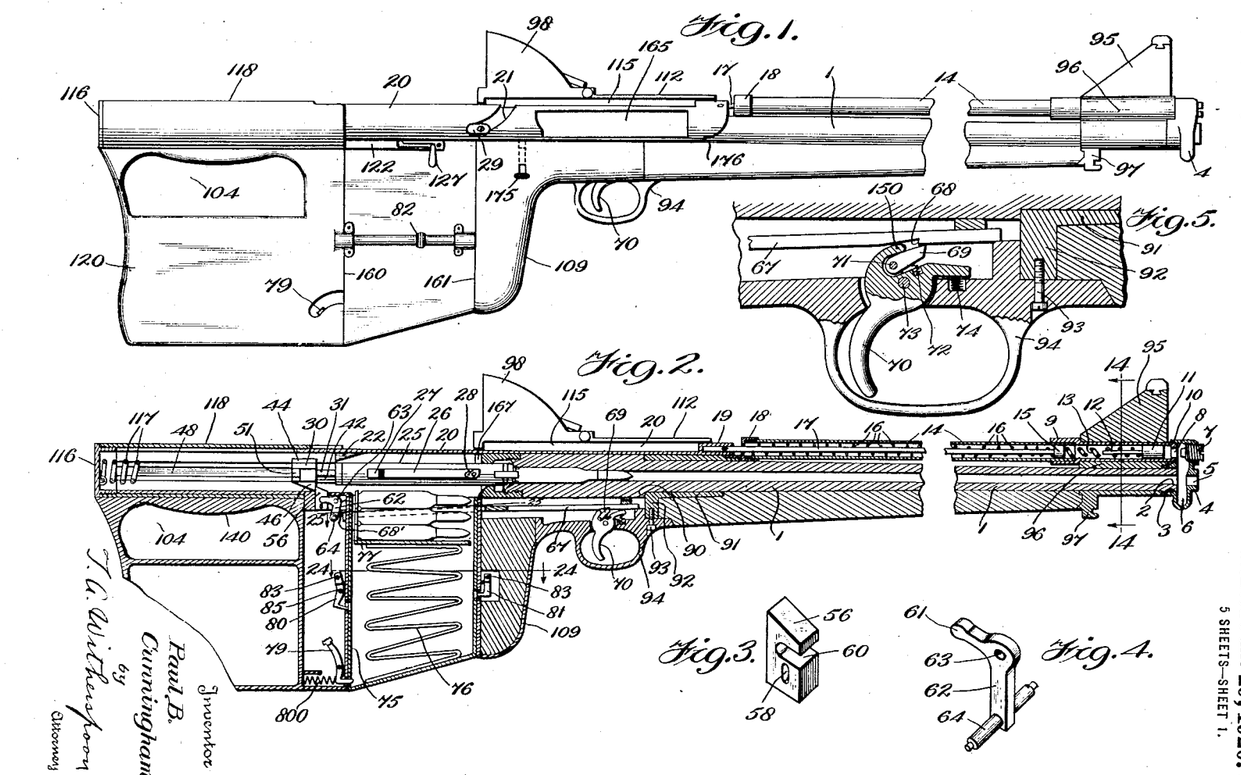
Figure 1 is a side elevational view, partly broken away of a rifle made in accordance with this invention.
Fig. 2 is a central longitudinal sectional view of the parts shown in Fig. 1.
Fig. 3 is a perspective of the cocking head sear.
Fig. 4 is a perspective view of the sear controlling lever.
Fig. 5 is a sectional detail view showing the trigger and sear rod after firing.
Figure 23:
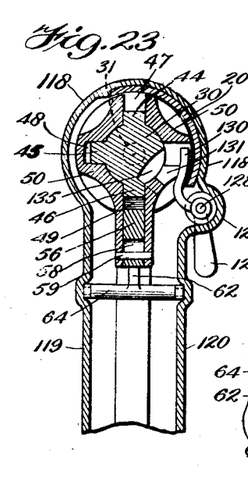
Fig. 23 is a section on the line 23—23 of Fig. 15 looking in the direction of the arrows.

The cocking head sear 56 is provided with a slot 58, Figs. 3 and 23, in which fits a pin 59, and it is also provided with a slot 60 in which fits the nose 61 of the sear controlling lever 62 pivoted as at 63, and provided with the cross arms 64 pivoting in the wings 65 and 66 of the sear rod 67, all as will be clear from Figs. 2, 4, 23 and 25. A spring 68' returns, to their normal positions, the lever 62 and sear rod 67 after the firing operation.

Said sear rod 67 is provided with a sear notch 68, see Fig. 5, into which enters the trigger sear 69 pivoted in the trigger 70 as at 71 and controlled by the spring 72. The trigger 70 is pivoted at 73 and is controlled by the spring 74.

Figure 20:
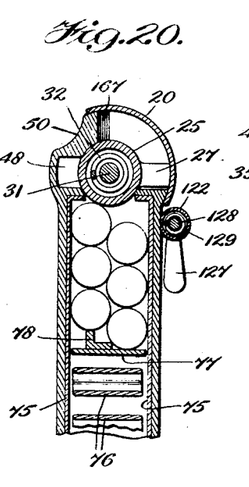
Fig. 20 is a section on the line 20—20 of Fig. 15 looking in the direction of the arrows.
Figure 24:
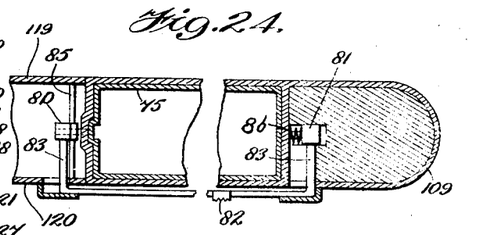
Fig. 24 is a section on the line 24—24 of Fig. 2, looking in the direction of the arrows; and—
Figure 25:
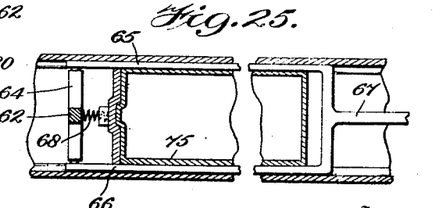
Fig. 25 is a section on the line 25—25 of Fig. 2.

The magazine 75 is provided with a spring 76, a follower 77, having a projection 78, see Fig. 20, a catch 79 controlled by a spring 800 and magazine cutoffs 80 and 81 controlled by the slide 82 and rods 83. The cutoff 80 is pivoted at 85, while the cutoff 81 is rigid with the slide rod 83, all as will be clear from Figs. 2 and 24. A spring 86 controls the cutoff 81 and slide 82.

The barrel 1 is provided with a shoulder 90 against which fits a sleeve 91 having an extension 92, into which passes the screw 93 from the trigger guard member 94. The construction is such as to hold the barrel and other recoiling parts firmly to the forestock, trigger guard, and rear stock members during firing.

Figure 9:
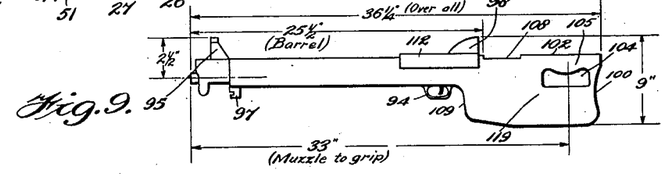
Fig. 9 is a side elevational view drawn to the same scale as Fig. 8, of the rifle made the subject of this invention.
Figures 10, 11, 12, 13, 14:
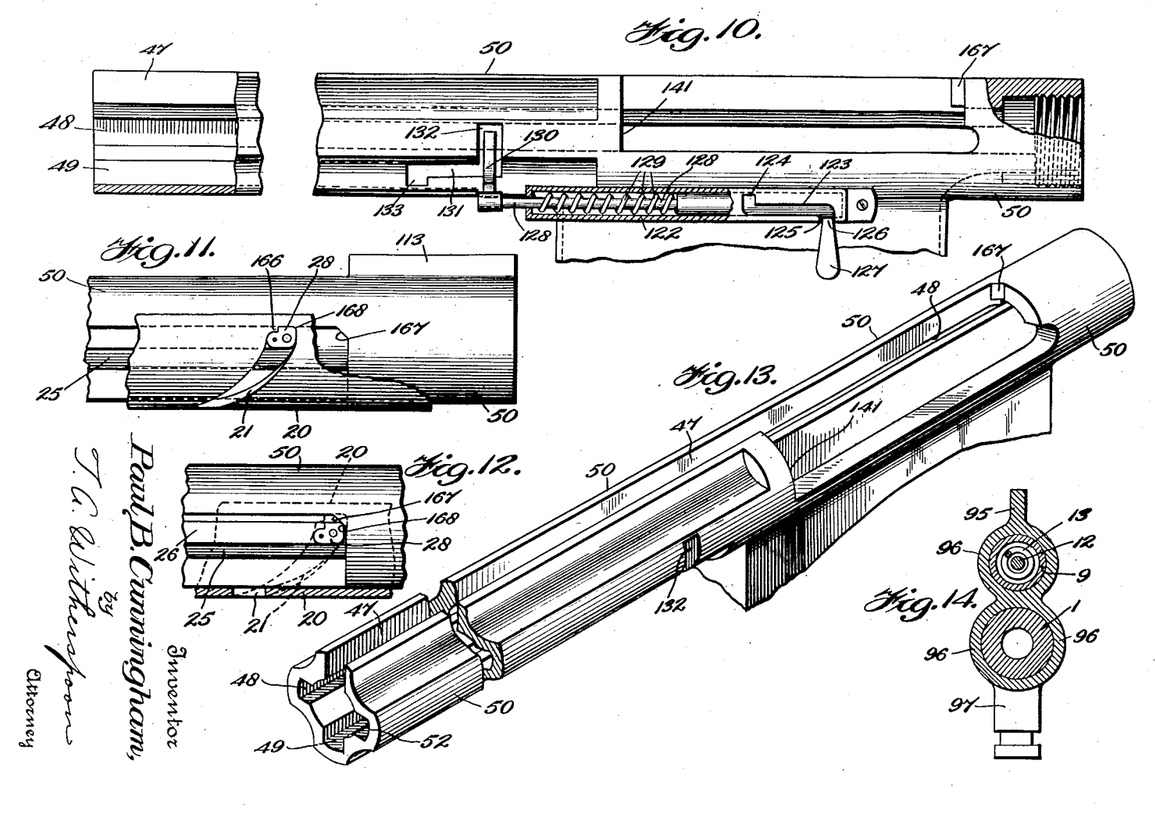
Fig. 10 is an enlarged detached view, partly broken away, of the receiver and hand cocking mechanism.
Fig. 11 is an enlarged detail view of portions of the receiver, bolt, and action slide in their positions just prior to locking the bolt.
Fig. 12 is a view similar to Fig. 11, with the movable parts rotated to their locked positions.
Fig. 13 is a perspective view of a portion of the parts shown in Fig. 10.
Fig. 14 is a sectional view taken on the line 14—14 of Fig. 2.

The front sight 95 is rigid with a double sleeve member 96, that encircles the tube 9 and barrel 1; and rigid with said double sleeve member is the bayonet lug 97 as best shown in Figs. 1, 2 and 14. The rear sight 98 may be of any suitable construction, and is conveniently supported on the curved plate 112, see Figs. 1 and 9, resting on and secured to the lugs 113 and 114 respectively carried by the receiver 50 and band 91, best shown in Figs. 7, 11, 17. The construction just mentioned affords a support for the rear sight above the action slide 20 and leaves a space 115 for the connection 19 to work in, thus enabling me to extend the rear sight as high above the bore as is desirable.

Figures 6, 7, 8:
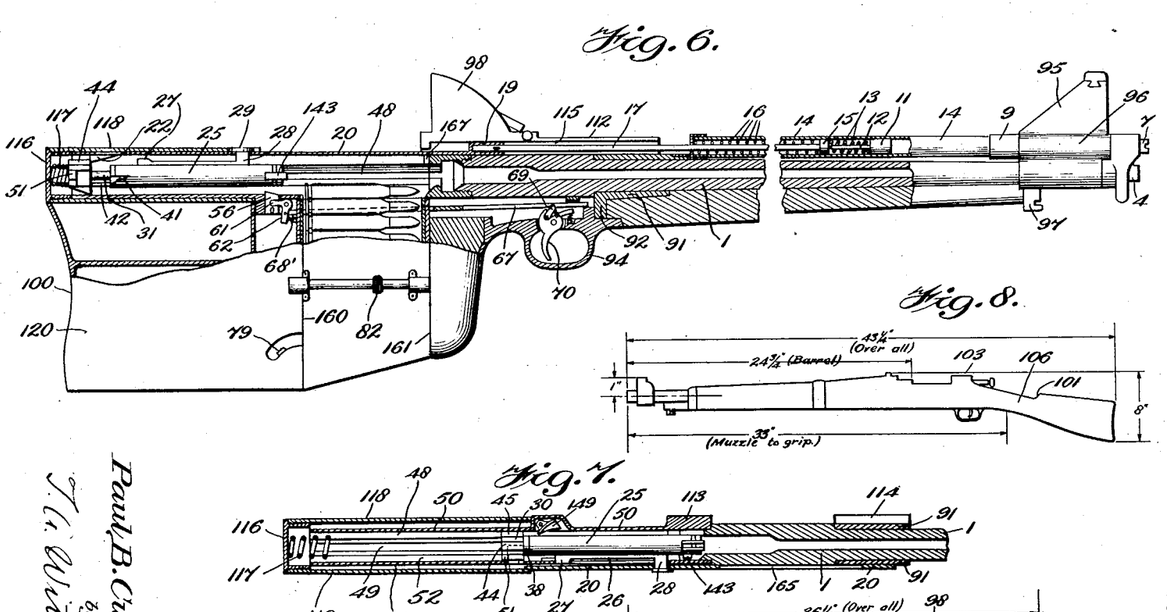
Fig. 6 is a sectional view similar to Fig. 2, showing the breech open and a cartridge about to be loaded into the barrel.
Fig. 7 is a sectional plan view on a plane at right angles to that of Fig. 6, showing the breech closed.
Fig. 8 is a side elevational view of the present army rifle.

The rear of the receiver 50 is provided with a closing cap 116, and a shock absorbing spring 117, while the parts are inclosed in a casing 118, see Fig. 1, 2, 6, 7 and 23. Said casing 118 is provided with the depending extensions 119 and 120, which constitute the two sides of the stock and which terminate at the rear of the magazine as best indicated in Figs. 6 and 7.

As best shown in Fig. 23, the extension 120 is bulged at 121, to accommodate the hand cocking mechanism consisting of the tubular member 122, provided with the slot 123 having the right angular extensions 124 and 125 in which operates the stem 126 of the hand cocking lever 127. Said stem 126 is rigid with the rod 128 surrounded by the spring 129 and carries at its rear end the curved cocking extension or arm 130, which operates in the slot 131, having the right angular extensions 132 and 133 with which the receiver is provided, all as will be clear from Figs. 1, 10 and 23. From Figs. 15, 16 and 23, it will be clear that the lug 51 of the cocking head is cut away, as well as a portion of the cocking head itself, to provide an operating slot 135 for the cocking arm 130 to enter.

An important feature of this invention resides in the peculiar contour and disposition of the parts by which I am enabled to produce an arm having several advantages over the prior arms. That is to say, as will be clear from a comparison of the dimensions given in Figs. 8 and 9, I have omitted about seven inches in the total length of the prior arms, or I have provided a shoulder contacting portion 100 of the stock, which is distant from the muzzle about thirty six and one fourth inches, or about the same distance as is the point 101 of the prior rifles, and therefore, I provide an arm which is easier to carry on horse back, or to ship, and in fact to handle in every way than is the old arm. Further, by providing this arm with the hand grip orifice 104 the soldier is enabled to dispose all of his fingers directly around the portion 105 instead of around and along the small of the stock 106, as in the prior arms. This enables him to get a much firmer grip on the piece for bayonet work than was possible heretofore. Further since the position of the right hand is no farther to the rear than in the case of the older guns, the reach of the soldier's bayonet is not lessened. Again, in firing my piece, the magazine, the receiver, the bolt and the heavy portions of my arm are several inches closer to the shoulder than in the older arms, and therefore, the soldier can fire with a steadier aim, than with the older pieces. Another very important feature of my invention resides in the fact that the cheek rests against the stock above the hole 104, with the eye above the surface 102, and on a level with the sight 95, so that I am enabled to not only raise the sights 95 and 98 much higher above the bore than heretofore, but I am also enabled to locate the eye at that particular distance behind the rear sight as will give the greatest accuracy in quick and ready firing. That is to say, with sights located for point blank range, say two and one half inches above the bore, any unintentional canting of said sights out of the vertical plane while aiming, is at once detected; and further, should a telescope barrel be employed for the rear sight and extended to the rear, it may be located sufficiently above the opening 108 in the receiver as to enable cartridges to be fed by hand underneath said barrel into the piece, neither of which advantages are present in the older pieces. By being free to locate the eye at the proper distance from the rear sight, to secure the most accurate quick aiming, as I am in this rifle, I render it more efficient at all ranges than heretofore.

Another advantage of the particular contour of my stock, resides in the fact that the vertically disposed surface 109 immediately behind the trigger guard 94 enables the fingers of the right hand to grasp the same squarely, firmly and naturally while aiming, thus avoiding the somewhat constrained position of the right hand which is inevitable in the older arms.

The operation of my invention will be clear from the foregoing, but is briefly summarized as follows:—

For bayonet work the stock is grasped by the right hand through the orifice 104, the fingers gripping the casing 118, and the filling piece 140 in a natural and firm manner, so that the piece may be held at the hip with great tenacity, while the left hand grasps the barrel between the trigger and the muzzle. The result is the rifle is held in a much firmer position than it is possible to hold the old rifle, owing to the particular conformation of the small of the stock, of the old rifle. The right hand is further protected on the under side by the extensions of the casing 118 and the filling piece 140. The reach of the soldier in bayonet work is not shortened for the reasons above stated.

When it comes to sighting, as above stated, the cheek rests on the stock very close indeed to the rear of the bolt, when the latter is in its locked position, and therefore, the eye naturally comes in a very advantageous position for taking a ready and quick sight at all ranges. As a matter of fact, the construction of the rear sight is such that it may be readily positioned to suit the user, and to thus have his eye automatically located at that distance in rear thereof as will promote the most accurate firing.

Figures 21, 22:
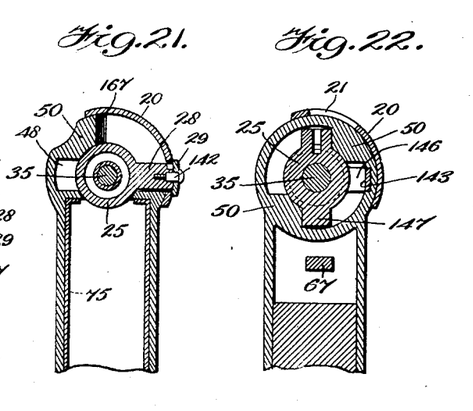
Fig. 21 is a section on the line 21—21 of Fig. 15 looking in the direction of the arrows.
Fig. 22 is a section on the line 22—22 of Fig. 15, looking in the direction of the arrows.

Regarding the bolt, it is shorter than the prior bolts, and in fact, it is necessary for it to be only long enough for the lug 27 to lock securely behind the forward shoulder 141 of the receiver, see Fig. 17, and for the lug 28 to function properly in connection with the slide 20 to lock and unlock the bolt. No operating bolt handle is required although when the parts are injured or shot away, and it is desired to operate the bolt by hand, any convenient tool, piece or spare handle may be screwed into the lug 27 in place, of the screw 142, see Fig. 21, and thus the bolt may be operated without the aid of the slide 20. Ordinarily, of course, the gases escaping into the chamber 6 act upon the piston 11 against the compression of the spring 13, whereupon the extension 12 will act upon the piston 15 against the compression of the spring 16, and the rod 17 will actuate the slide 20, which, through the slot 21, will first unlock the bolt and then carry the said bolt to the rear where the shock absorbing spring 117 cushions the rearward travel of the bolt.

At the beginning of the rearward travel of the slide 20, the cocking tang 22 strikes against the lug 44 of the cocking head 30 and thus cocks the piece while the slot 21 is revolving the bolt to unlock the same. By the time the bolt has revolved sufficiently far to be unlocked the extension 42 of the cocking head has traveled out of the V-shaped slot 41, in the bolt, and has contacted against the rear edge of the flange or collar like member 38 of the plug 36, so that the cocking head cannot again move forward to fire the piece until the bolt 25 has been revolved sufficiently to securely lock it in place. That is to say, while the breech is open, and the bolt is in its rearward position, the extension 42 is so positioned against the rear edge of the member 38 that said cocking head cannot move forward and it remains in this position when the bolt goes forward to be locked, and when the said cocking head contacts with the sear 56 as clearly shown in Fig. 2. It thus results that it is not possible to fire the piece under any condition except when the bolt has been turned in the screw box sufficiently to lock its head firmly in place.

The extractor 143, as best shown in Fig. 19, is provided with the semi-circular spring members 144 which fit in the groove 145 of the bolt head, as shown in Fig. 17, so that said extractor may be readily attached to and detached from the bolt at pleasure. The recess 146 of the extractor, accommodates the locking lug 147, as shown in Fig. 16, when the bolt revolves, and the body 143 of said extractor slides in the groove 148 of the receiver, as illustrated in Fig. 17.

The ejector 149 is or may be of the usual type. Of course, the spring 16 returns the slide 20 and bolt 25 after the gases have escaped from the chamber 6. It will be further observed that when the bolt is thus returned to its locked position, the cocking head and parts assume the positions shown in Fig. 2, with the forward face of the lug 46 taking against the sear 22. When in this position, the bolt has been turned by the lug 28 and slot 21, to such an extent that the V-shaped slot 41 is now opposite the extension 42 of the cocking head, and therefore, when the trigger is pulled, the said extension 42 can go forward into the V-shaped lug 41, and thus fire the piece.

This action is accomplished by pulling the trigger 70, whereupon the trigger sear 69 moves the sear rod 67 forward, by reason of the engagement of the said sear 69, with the notch 68 in said sear rod, and the forward movement of said sear rod is communicated to the cross arms 64 carried by the lever 62, which turns said lever on its pivot 63 and causes its nose 61 to pull down the sear 56 and thus release the cocking head 30, all as will be clear from Figs. 2 and 5.

The cocking head 30 and firing pin 35 now move forward, under the action of the main spring 32, and the piece is fired. In the meantime, owing to the contraction of the muscles of the operator, upon firing, the trigger 70 will be retracted to such an extent that the sear 69 will leave the notch 68, owing to the extension 150, of the trigger, which presses against the rear edge of the trigger sear 69, and thus any further pulling of the trigger is inoperative to fire the piece, although the action of the operating rod has caused the ejection of the cartridge, and has caused a new cartridge to be picked up from the magazine by the forward movement of the bolt, and loaded into the piece in the usual manner. Therefore, I consider this an important feature of the invention, because, it results from this that, there can be no accidental firing of the piece before the trigger is released, and before it has been intentionally pulled again. In other words, so far as has now been described, it is not only impossible to fire this piece when the bolt is not fully locked home, but it is also impossible to fire it without first releasing the trigger, and then pulling the trigger again, so that a maximum of safety and certainty is thus insured. When the trigger has been intentionally released, however, its spring 74 will turn the sear 69 in a counter clockwise direction, as seen in Fig. 5, and cause said sear to again engage the notch 68 against the compression of the sear spring 72.

But when this reëngagement has taken place, the gun is ready for firing again. In other words, the extraction of the cartridge shell and the loading of the piece being entirely automatic, and therefore very rapid, the gun can be fired with certainty as fast as the trigger can be pulled and released, but it cannot be fired unintentionally without going through the above mentioned intentional motions. The magazine casing 75, it will be observed, is unusually long, owing to the great vertical depth of the rear stock.

In fact, I find it can be made to contain 20 or more cartridges. It has the follower 77 which is provided with the upward extension 78, see Fig. 20, and this extension not only serves to stagger the cartridges, as illustrated, and enable them to be fed one by one into the chamber, but said extension 78 also comes up in the path of the bolt 25 when the magazine is empty and thus prevents the bolt from going forward and closing the chamber.

When it is desired to use a less number of cartridges, the slide 82 may be operated to move the cutoffs 80 and 81 and thus limit the number fired to 5, leaving 15 in reserve. When cocking the piece by hand or by means of the lever 127, the same is turned on the rod 128 as an axis, to slide along the slot 123, which action causes the arm 130 to move into the slot 135 of the cocking head and to move the cocking head to the rear against the compression of the main spring 32. This movement may be just sufficient to engage the cocking head behind the sear 56 or the lever 127 may be moved up into the slot 124 and there left in place, so that the piece cannot be fired until said lever 127 is released. This said cocking lever 127 thus performs a double function of a cocking means, and of a safety catch. Further, in order to insure the safety feature, when the lever 127 moves into the notch 124, the dimensions of the parts are such that the cocking arm 130 will move into the notch 133 and thus the cocking head will be securely locked against all firing whether the trigger is pulled or not. In other words, before the piece could be fired, when the arm is in engagement with the notch 133, both the lever 127 and the trigger would have to be operated.

It will now be clear that the surface 100 of the rear stock which contacts with the shoulder has even greater vertical dimensions than does the corresponding surface in the army rifle, for the extension is through a space of almost seven inches. It will further be observed that the flat sides 119 and 120 of the casing 118 terminate at or above the line 160 in Fig. 6, but the shape of the receiver 50 is such that its sides continue on to the line 161 whereupon the front vertically disposed hand grip 109 continues the contour of the said side of the rear stock. In other words, the total distance from the vertically disposed front grip 109 to the rear shoulder surface 100 may be 11 or 12 inches, or even more, and the flat sides of the rear stock substantially extend over all of this distance, with the result that said flat sides of the stock are of sufficient dimensions to maintain the bolt both in its locking and in its retracted positions, as well as to close the magazine. In fact, said sides extend so far forward that the rear sight 98 is conveniently located over their forward portions as illustrated. The trigger 70, however, is located even farther forward than is the vertical front grip 109. The disposition of parts just disclosed all serve to produce a contour of the rear stock which is especially adapted to firmly rest against the shoulder of the operator and to be most firmly gripped by the right hand, and pressed against the body by reason of the vertical disposition of the front grip 109.

A further important feature of this invention resides in the peculiar shape and disposition of the action slide 20. It will be observed especially from Figs. 1, 2, 20 and 21, that this said slide extension when in the position of firing, is well forward of the cartridge chamber, and well to the rear of the bolt chamber, so that the entire arm is normally tightly closed against the entrance of dust, moisture, etc.

Said slide in its rearward motion moves within the outer cover member 118 and is provided near its forward part with the cartridge edge slot 165 for the accommodation of the empty shells after firing. In other words, the bolt chamber is only opened momentarily and therefore, there is very little danger of foreign substances entering the same through accident, no matter how rough the use may be.

The slot 21 in said slide is provided near its forward end with a projection 166, see Fig. 11, which fits into a corresponding depression in the lug 28, and thus serves to lock said lug more firmly in place when the bolt is opening. Further, the receiver 50 is provided with an inclined surface 167 adapted to contact with a beveled off surface 168 on the said lug 28, when the bolt is driven home, whereby the rotation of the bolt is started and thus the firm locking of the bolt in place is secured, all as will be clear from Figs. 11 and 12.

Should it be desired to hold the action open for an extended period of time in order to load cartridges into the magazine, from the top, the sliding catch 175 may be moved upwardly after the action slide 20 has completed its rearward movement thereby catching against the shoulder 176 on said slide and preventing a forward movement thereof until the catch 175 is released.

It is obvious that those skilled in the art may vary the details of construction as well as the arrangement of parts without departing from the spirit of this invention, and therefore, I do not wish to be limited to the above disclosure except as may be required by the claims.

What I claim is:—

1. In a shoulder arm the combination of a rear stock provided with a front vertically disposed portion located forward of the breech of the barrel and adapted to be gripped by the right hand; a magazine and breech closing bolt located in said stock in rear of said vertically disposed portion; a rear sight; and a trigger located forward of said sight, substantially as described.

2. In a shoulder arm the combination of a rear stock provided with a front vertically disposed portion located forward of the breech of the barrel and adapted to be gripped by the right hand and also provided with a hand hole for bayonet work; a magazine and breech closing bolt located in said stock in rear of said vertically disposed portion; a rear sight located above said portion; and a trigger located forward of said sight, substantially as described.

3. In a shoulder arm the combination of a rear stock provided with flat faces extending forward to the breech of the barrel terminating in a vertically disposed portion constituting a grip for the right hand and provided with a hole for an additional hand grip; a magazine located between said faces; a trigger located forward of said faces; a rear sight positioned between said trigger and magazine; a bolt; an action slide located above the barrel and beneath said rear sight to operate said bolt; and gas operated means located above the barrel to actuate said slide, substantially as described.

4. In a shoulder arm the combination of a rear stock provided with flat faces extending forward to the breech of the barrel terminating in a vertically disposed portion constituting a grip for the right hand, and provided with a hole for an additional hand grip; a magazine located between said faces; a trigger located forward of said faces; a rear sight positioned between said trigger and magazine; a bolt; an action slide located above the barrel and beneath said rear sight to operate said bolt; gas operated means located above the barrel to actuate said slide; and a front sight located above the gas operated means coacting with said rear sight, substantially as described.

5. In a fire arm the combination of a rear stock provided with flat faces terminating in a vertically disposed grip for the right hand located under the breech end of the barrel; a trigger located forward of said vertically disposed grip; a bolt and a magazine located between said faces; gas operated means for operating said bolt extending along the top of the barrel when in firing position; a rear sight located above said hand grip, outside said gas operated means; and a front sight located outside said gas operated means and provided with a double sleeve member encircling the barrel, substantially as described.

6. In a fire arm the combination of a rear stock provided with flat faces terminating in a vertically disposed grip for the right hand located under the breech end of the barrel; and provided with a hole near its butt end to form a hand grip for bayonet work; a trigger located forward of said vertically disposed grip; a bolt and a magazine located between said faces; gas operated means for operating said bolt extending along the top of the barrel when in firing position; a rear sight located above said hand grip out side said gas operated means; and a front sight located outside said gas operated means and provided with a double sleeve member encircling the barrel, carrying a lug adapted to receive a bayonet, substantially as described.

7. In a fire arm the combination of a receiver; a bolt sleeve located in said receiver; a screw plug having a flange closing the rear end of said sleeve said flange and sleeve being recessed to form a V-shaped slot; a cocking head having an extension adapted to rest on said flange when the sleeve is in its unlocked position and to enter said slot when said sleeve is in its locked position; an operating lug carried by said bolt; and a slotted action slide adapted to operate said lug and bolt; substantially as described.

8. In a fire arm the combination of a receiver; provided with slide ways; a bolt sleeve located in said receiver; a screw plug having a flange closing the rear end of said sleeve, said flange and sleeve being recessed to form a V-shaped slot; a cocking head provided with lugs movable in said ways having an extension adapted to rest on said flange when the sleeve is in its unlocked position; a sear lug carried by said cocking head; a vertically reciprocating sear for controlling said sear lug and cocking head; an operating lug carried by said bolt; and a slotted action slide adapted to operate said lug and bolt, substantially as described.

9. In a fire arm the combination of a receiver; a bolt provided with a cocking head and a sleeve in said receiver; means preventing said cocking head from rotating; means causing said bolt sleeve to rotate; and connections between said sleeve and cocking head comprising a screw threaded slotted plug fitting said sleeve and preventing said cocking head from firing the piece before said bolt is securely locked in place, substantially as described.

10. In a fire arm the combination of a receiver; a bolt provided with a cocking head and a sleeve in said receiver; means preventing said cocking head from rotating; means causing said bolt sleeve to rotate; comprising an action slide provided with a tang to move said cocking head while said sleeve is rotating; and connections between said sleeve and cocking head comprising a screw threaded slotted plug preventing said cocking head from firing the piece before said bolt is securely locked in place, substantially as described.

11. In a fire arm the combination of a rear stock adapted to rest against the shoulder, provided with a front vertically disposed portion located under the breech end of the barrel, and adapted to be gripped by the right hand when said stock rests against the right shoulder; a receiver; a bolt having a cocking head in said receiver; a magazine in rear of said vertical portion; a sear in rear of said magazine for controlling said cocking head; a sear rod extending forward of said magazine and vertical portion for controlling said sear; and a trigger provided with a sear forward of said magazine and vertical portion adapted to operate said sear rod, substantially as described.

12. In a fire arm the combination of a rear stock adapted to rest against the shoulder, provided with a front vertically disposed portion located under the breech end of the barrel, and adapted to be gripped by the right hand when said stock rests against the right shoulder; a receiver; a bolt having a cocking head in said receiver; a magazine; a vertically slidable sear in rear of said magazine for controlling said cocking head; a sear rod extending forward of said magazine and vertical portion provided with a lever for controlling said sear; a trigger provided with a sear forward of said magazine and vertical portion adapted to operate said sear rod; and a spring for controlling said last named sear, substantially as described.

13. In a fire arm the combination of a rear stock adapted to rest against the shoulder, provided with a front vertically disposed portion located under the breech end of the barrel, and adapted to be gripped by the right hand when said stock rests against the right shoulder; a receiver; a bolt having a cocking head in said receiver; a magazine; a sear in rear of said magazine for controlling said cocking head; a sear rod extending forward of said magazine for controlling said sear; and a trigger provided with a pivoted sear forward of said magazine and vertical portion adapted to operate said sear rod, said trigger also provided with a lug and sear spring coacting with said last named sear and with a trigger spring to return said trigger to its normal position, substantially as described.

14. In a fire arm having a magazine the combination of a receiver; a bolt in said receiver having a lug; and a semi-circular action bar having a curved slot in which said lug operates to lock and unlock said bolt, adapted to normally cover the loading opening into the receiver and magazine and provided with a slot for the ejection of the empty shells, substantially as described.

15. In a fire arm having a magazine the combination of a receiver; a bolt in said receiver having an operating lug; and a semi-circular action bar having a curved slot in which said lug operates to lock and unlock said bolt, adapted to normally cover the loading opening into the receiver and magazine and provided with a slot for the ejection of the empty shells, and said bar further provided with a means for cocking the bolt and for locking with said operating lug when the bolt is home, substantially as described.

16. In a fire arm the combination of a receiver; a bolt having a non-rotating cocking head provided with a slot located in said receiver; a hand operated lever provided with a rotating cocking arm adapted to enter said slot to cock the piece; and means to lock said arm in place, substantially as described.

17. In a fire arm the combination of a receiver having slots at right angles to each other; a cocking head provided with a slot; a cocking arm adapted to operate in said slots; a rod carrying said cocking arm; a sleeve provided with slots at right angles to each other; and a lever rigid with said rod operating in said last named slots, substantially as described.

In testimony whereof I affix my signature.

PAUL B. CUNNINGHAM.